(12) United States Patent
Wirthlin

(10) Patent No.: US 6,333,512 B1
(45) Date of Patent: Dec. 25, 2001

(54) OPTICAL GAUGE FOR DETERMINING THE LEVEL OF A MEDIUM IN A CONTAINER

(76) Inventor: Alvin R. Wirthlin, 4964 S. Crescent Ave., Springfield, MO (US) 65804

( * ) Notice: Subject to any disclaimer, the term of this patent is extended or adjusted under 35 U.S.C. 154(b) by 0 days.

(21) Appl. No.: 09/350,487

(22) Filed: Jul. 9, 1999

Related U.S. Application Data

(60) Provisional application No. 60/092,968, filed on Jul. 15, 1998.

(51) Int. Cl.$^7$ ................................................ G01F 23/292
(52) U.S. Cl. ............................................ 250/577; 250/901
(58) Field of Search ........................... 250/900, 901, 250/902, 903, 904, 905, 906, 907, 908, 573, 574, 577, 227.11, 361 R

(56) References Cited

U.S. PATENT DOCUMENTS

| | | | |
|---|---|---|---|
| 3,895,235 | * 7/1975 | Melone | 267/226 |
| 4,274,705 | 6/1981 | Miller | 350/96 |
| 4,371,897 | 2/1983 | Kramer | 358/294 |
| 4,727,247 | 2/1988 | Johnston | 250/227 |
| 4,870,292 | 9/1989 | Alpert et al. | 250/577 |
| 4,880,971 | 11/1989 | Danisch | 250/227 |
| 4,880,990 | 11/1989 | Rando | 250/577 |
| 4,942,306 | 7/1990 | Colbourne | 250/577 |
| 4,994,682 | 2/1991 | Woodside | 250/577 |
| 5,070,237 | 12/1991 | Okuyama et al. | 250/277 |
| 5,073,720 | * 12/1991 | Brown | 250/577 |
| 5,132,530 | 7/1992 | Groh et al. | 250/287 |
| 5,291,032 | 3/1994 | Vali et al. | 250/577 |
| 5,743,135 | * 4/1998 | Sayka et al. | 73/293 |

FOREIGN PATENT DOCUMENTS

| | | | |
|---|---|---|---|
| 0186138 | 7/1986 | (EP) | 250/227 |
| 2173894 | 10/1986 | (GB) | 250/504 |
| 0117116 | 6/1985 | (JP) | 250/227 |
| 0184706 | 7/1990 | (JP) | 250/227 |

* cited by examiner

*Primary Examiner*—Seungsook Ham
*Assistant Examiner*—Bradford Hill
(74) *Attorney, Agent, or Firm*—Alvin R. Wirthlin

(57) ABSTRACT

An optical gauge for measuring the level of a liquid in a container comprises an elongate, tubular member with a central bore. A light source is positioned for projecting radiant energy into the bore along a length of the tubular member. An elongate light collector is spaced from the light source and extends along the length of the tubular member for receiving radiant energy from the light source. The light collector has opposite ends and is formed such that radiant energy incident on a length of the light collector is transmitted to the light collector ends. A light blocking member is located within the bore and extends between the light source and at least a portion of the elongate light collector for blocking at least a portion of the radiant energy from the light collector. The light blocking member is movable with respect to the light collector in response to change in liquid level within the tubular member for varying the position of the radiant energy incident on the light collector to thereby vary the amount of radiant energy transmitted to the light collector ends. At least one photosensor is positioned proximal at least one of the light collector ends for detecting the amount of radiant energy transmitted thereto. With this arrangement, the amount of radiant energy received by the light collector and detected by the at least one photosensor is indicative of the liquid level.

20 Claims, 6 Drawing Sheets

OPTICAL GAUGE FOR DETERMINING THE LEVEL OF A MEDIUM IN A CONTAINER

RELATED APPLICATION

This application claims the benefit of U.S. Provisional Application No. 60/092,968, filed on Jul. 15, 1998.

BACKGROUND OF THE INVENTION

1. Field of the Invention

This invention relates to optical gauges, and more particularly to optical gauges for determining the level of a medium in a container, such as the level of fuel in a fuel tank.

2. Description of the Related Art

Prior art liquid level gauges, such as fuel gauges for motor vehicles, usually include a float that rides on an upper surface of the fuel in a fuel tank. The float is typically connected to one end of a pivot arm while the other end of the pivot arm typically includes a wiper mechanism that brushes against a resistor strip when the arm is rotated due to a change in fuel level in the tank. The wiper mechanism, when rotated, causes a change in electrical resistance which is displayed at a convenient location in the passenger compartment of the vehicle. Ideal fuel level measurement conditions would require the vehicle to remain stationary or travel along a flat, horizontal surface at a constant velocity in order to eliminate any fuel sloshing in the tank. However, it is not possible to achieve ideal measurement conditions in the real world. Variations in velocity, acceleration and centrifugal forces, road roughness, response of the vehicle's suspension, and other factors may cause the fuel to slosh in the tank in an unpredictable manner. When sloshing occurs, float movement becomes erratic and may result in false measurements of the actual fuel level in the tank.

Moreover, liquid level gauges with moving parts that are linked together, such as float and pivot arm assemblies, resistance strips, etc., are subject to wear. Worn parts may result in mechanical and/or electrical breakdown of the gauge or, at the very least, inaccurate liquid level detection.

SUMMARY OF THE INVENTION

It is an object of the present invention to provide an improved liquid level gauge that addresses the aforementioned disadvantages.

According to the invention, an optical gauge for measuring a level of a liquid in a container comprises an elongate, tubular member having a central axis and a bore extending parallel to the central axis, with the bore being adapted to receive liquid that may be present in the container. A light source is positioned for projecting radiant energy at least into the bore along a length of the tubular member. An elongate light collector is spaced from the light source and extends along the length of the tubular member for receiving, at least indirectly, radiant energy from the light source. The light collector has opposite ends and is formed such that radiant energy incident on a length of the light collector is transmitted to the light collector ends. A light blocking member is located within the bore and extends between the light source and at least a portion of the elongate light collector for blocking at least a portion of the radiant energy from the light collector. The light blocking member is movable with respect to the light collector in response to change in liquid level within the tubular member for varying the position of the radiant energy incident on the light collector to thereby vary the amount of radiant energy transmitted to the light collector ends. At least one photosensor is positioned proximal at least one of the light collector ends for detecting the amount of radiant energy transmitted thereto. With this arrangement, the amount of radiant energy received by the light collector and detected by the at least one photosensor is indicative of the liquid level.

In one embodiment of the invention, the light blocking member comprises one or more floats that ride along an upper surface of the liquid in the tubular member.

In a further embodiment of the invention, the light blocking member comprises an upper surface of the liquid.

In yet a further embodiment of the invention, the light blocking member comprises the liquid itself.

Other objects and advantages of the invention will become apparent upon reading the following detailed description and appended claims, and upon reference to the accompanying drawings.

BRIEF DESCRIPTION OF THE DRAWINGS

The preferred embodiments of the present invention will hereinafter be described in conjunction with the accompanying drawings, where like designations denote like elements throughout the drawings, and where.

DETAILED DESCRIPTION OF THE PREFERRED EMBODIMENTS

Figures 1, 2:
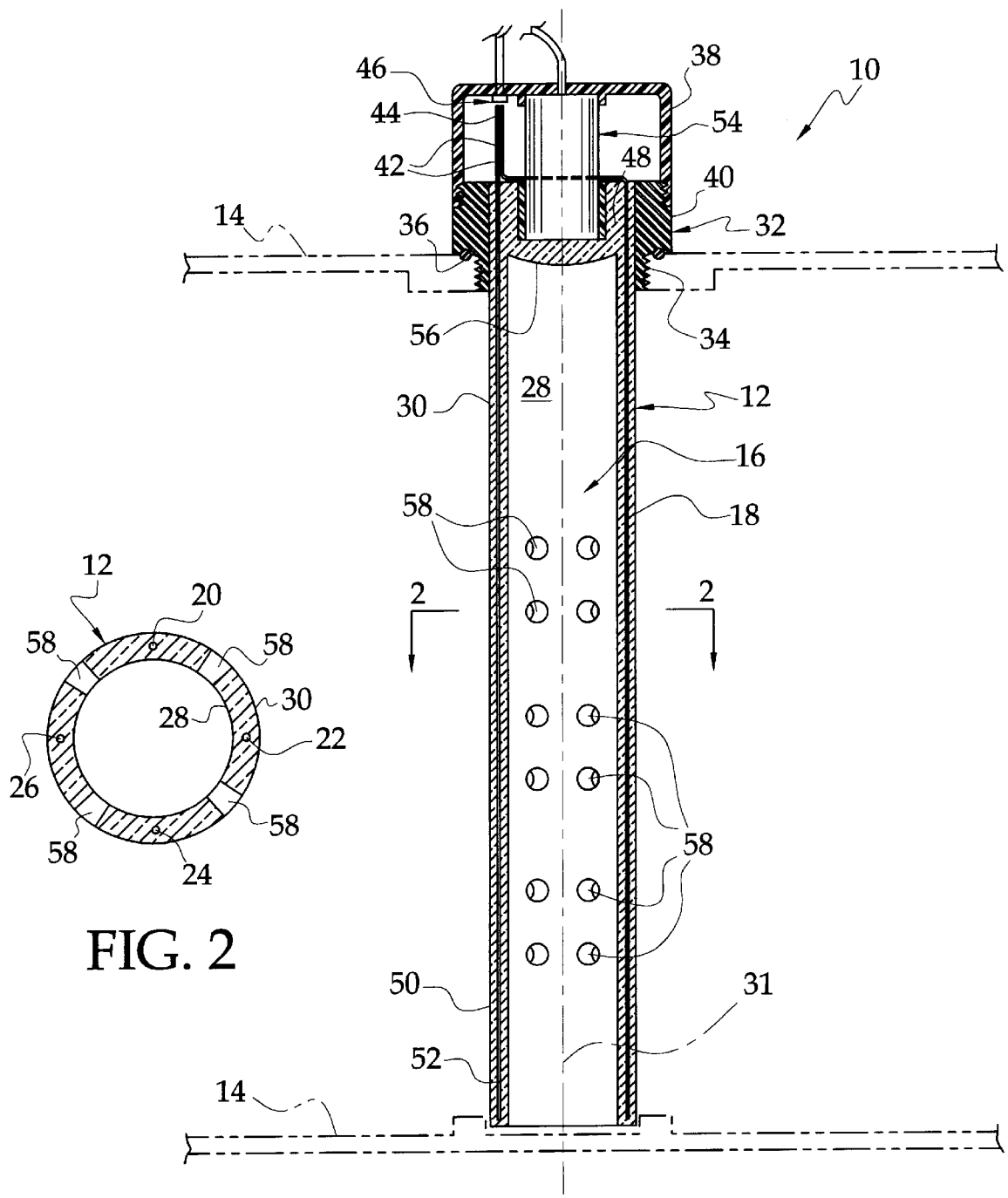
FIG. 1 is a cross-sectioned elevational view of an optical fluid level gauge according to a first embodiment of the invention for mounting in a fuel container.
FIG. 2 is an enlarged cross-sectional view of the optical fluid level gauge taken along line 2—2 of FIG. 1.

Referring now to the drawings, and to FIGS. 1 and 2 in particular, a fluid level gauge 10 according to the present invention includes an elongate tubular member or housing 12 that is adapted for mounting in a container 14 (shown in phantom line), such as the fuel tank of a motor vehicle. The tubular member 12 includes a central bore 16 and has a continuous wall 18 that surrounds the central bore. The tubular member 12 is preferably constructed of transparent or translucent material that is resistant to the liquid in which it is to be immersed. A plurality of conduits 20, 22, 24, and 26 are preferably formed at equally spaced circumferential intervals in the wall 18 of the tubular member between an inner wall surface 28 and an outer wall surface 30, and extend generally parallel to a central axis 31 of the tubular member. The conduits can be formed simultaneously with the tubular member during extrusion or other molding processes. Alternatively, smaller tubing (not shown) may be adhered to the inner and/or outer surfaces of the tubular member or coextruded therewith.

A tank mounting flange 32 is located at an upper end 48 of the tubular member 12. The tank mounting flange 32 may be secured to the tubular member by adhesives, ultrasonic welding, or other well-known attachment means. The mounting flange 32 has a threaded lower portion 34 that engages with corresponding threads in the container 14. An O-ring 36 may be provided adjacent the threaded lower portion 34 for sealing the mounting flange 32 to the tank 14. A cap member 38 is threaded onto an upper portion 40 of the mounting flange.

Light collectors 42, preferably in the form of generally elongate fluorescent-doped fiber optics or the like are positioned in each conduit 22 to 26. A suitable fluorescent-doped fiber optic may be constructed of a polystyrene-based core containing one or more fluorescent dopants that is surrounded by a polymethyl methacrylate cladding. When such a fiber optic receives radiation along its length, energy is absorbed in the fiber optic at a certain wavelength and is re-emitted at both ends of the fiber optic at a longer wavelength. Thus, depending on the amount of radiation absorbed by the fiber optic along its length, a proportionate amount of radiation is emitted at the ends of the fiber optic. Although the fiber optic is preferably circular in cross section, it is contemplated that other cross sectional shapes such as oval, triangular, rectangular, arcuate, etc., may be used. Moreover, it is to be understood that the light collector 42 is not to be limited to the particular material as set forth in the exemplary embodiment. The core and cladding may be formed out of any suitable transparent or translucent materials, as long as the index of refraction of the core material is greater than the index of refraction of the cladding material. The cladding material itself may be air or other fluid surrounding the core. Transparent or translucent material combined with a fluorescent doping material may alternatively be injected into the conduits to serve as the light collectors 42.

At least one end of each light collector 42, such as upper end 44, is proximal to a photosensor 46 that preferably varies in electrical output in response to light level variations to which the photosensor is exposed. Suitable photosensors may include, without limitation, photocells, photodiodes, phototransistors, photoconductors, and the like. As shown in FIG. 1, a single photosensor 46 is positioned at an upper end 48 of the tubular member 12 within the cap member 38 for measuring radiant energy incident on the upper ends 44 of all the light collectors 42. It is to be understood, however, that more than one photosensor may be positioned at the upper end 48 of the tubular member in alignment with one or more of the light collectors. Moreover, although four separate light collectors 42 are shown, more or less light collectors can be used depending on the strength and sensitivity of the measurement output desired. A photosensor may additionally or alternatively be positioned at a lower end 50 of the tubular member 12 proximal to a lower end 52 of one or more of the light collectors 42 for measuring the amount of incident at one or more of the lower ends 52, as will be described in greater detail with respect to FIG. 4. Preferably, the photosensors are arranged at one or more of the collector ends so as to detect only light emanating therefrom.

A light source 54 is positioned at the upper end 48 of the tubular member 12, preferably within the cap member 38, so as to project light into the central bore 16 between the light collectors 42. In one preferred embodiment, light is emitted from the light source 54 at an angle such that the light may project onto the tubular member 12 and along the lengths of the light collectors 42. For this purpose, a diverging lens 56 may be provided in the tubular member 12 adjacent the light source 54. As shown, the lens is integrally molded with the tubular member. The light source 54 may be in the form of one or more fluorescent lights, incandescent bulbs, light-emitting diodes, laser diodes, or any other source that emits radiant energy in one or more of the visible, ultra-violet, or infra-red spectrums. When an infra-red light source is used, the or each photosensor is of the infra-red type, such as an infrared photodiode.

Although the light source 54 is shown positioned at the upper end 48 of the tubular member 12, it may additionally or alternatively be positioned at the lower end 50 of the tubular member. Where two light sources are mounted at opposite ends of the tubular member, the light sources should emanate light at different frequencies and/or wavelengths so as to distinguish between them.

A plurality of apertures 58 extend through the wall 18 of the tubular member 12 to allow the transfer of liquid between the central bore 16 and the container 14. The apertures 58 are preferably located at axially spaced locations along the tubular member and may also be circumferentially spaced around the tubular member. Depending on the size and number of apertures 58, the rate at which liquid enters and leaves the tubular member can be controlled. This is especially advantageous when the liquid in the container is subject to sloshing. At equilibrium, the level of liquid in the tubular member is equal to the level of liquid in the container. When liquid sloshing occurs within the container, the apertures in the tubular member may be sized to create a delay in the transfer of fluid between the container and the tubular member to thereby dampen variations in liquid level within the tubular member.

Although not shown in FIG. 1, an opaque material may surround the tubular member or the tubular member may be located within an opaque housing for blocking unwanted outside light that may be transmitted through containers constructed of translucent plastic material, especially when using a light source 54 that transmits light in the visible spectrum.

Depending on the opacity of the liquid to be measured, light absorption in the liquid may be quite different than in air, or in the case of fuels, light absorption in the fuel may be quite different than light absorption in fuel vapors that may be present in the tubular member 12. This difference can be detected by measuring how much light emitted from the light source is reflected and/or absorbed by the liquid. Where the light from the light source is at least partially absorbed by the liquid being measured, less light is able to reach the light collector 42 when the container 14 is full. As the container empties, the level of liquid within the tubular member descends and exposes more of the length of fiber optic to the emitted light. As more of the fiber optic is exposed to the light, the intensity of light at the ends of the fiber optic increases. This change in intensity is measured by the photosensor(s) 46, which is reflective of liquid level in the container.

Figure 3:
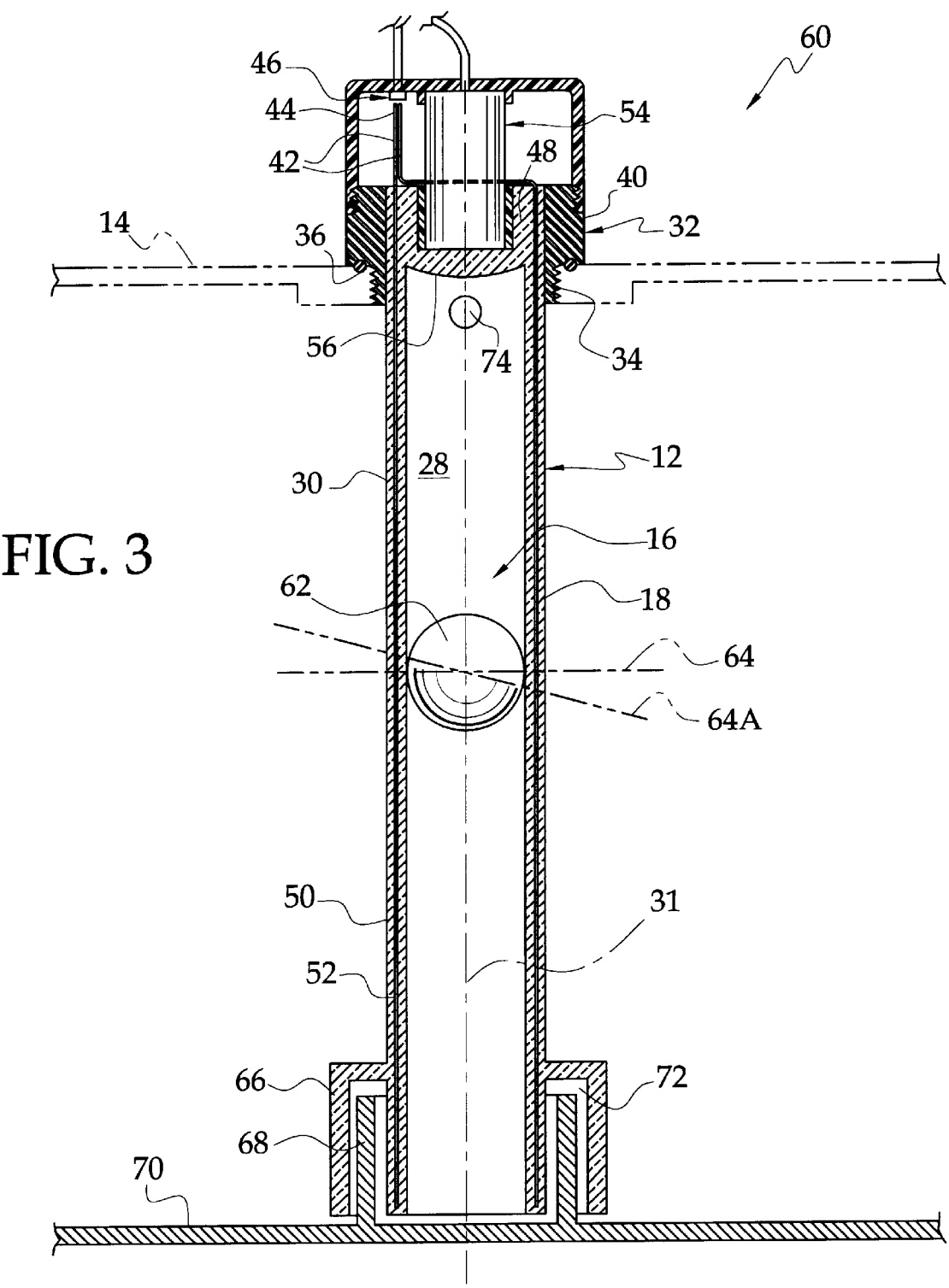
FIG. 3 is a cross-sectioned elevational view of an optical fluid level gauge according to a second embodiment of the invention.

With reference now to FIG. 3, a fluid level gauge 60 according to a second embodiment of the invention is illustrated, wherein like parts in the previous embodiment are represented by like numerals. In this embodiment, a float 62 is located in the tubular member 12 and is preferably substantially spherical in configuration. The outer diameter of the float 62 is slightly smaller than the inner diameter of the tubular member to allow free movement of the float within the tubular member. The float is preferably constructed of an opaque material and may also or alternatively have an outer reflective coating. The float 62 rides along the upper surface 64 (represented by phantom line) of the liquid in the tubular member and serves to substantially block light from the length of the light collectors 42 below the liquid level. This is especially advantageous when the liquid being measured exhibits low light absorption characteristics, which is prevalent in transparent or many translucent liquids. The float 62 also eliminates the need to calibrate the probe for different liquids having different light absorption properties. Since the float 62 is spherical and free-floating in the tubular member 12, it is not subject to the difficulties associated with prior art floats and their attached pivot arms. Moreover, the spherical nature of the float 62 helps to prevent inaccurate measurement when the liquid in the tubular member 12 is subject to gravitational or acceleration forces, as represented by the angled upper liquid surface 64A (shown in phantom line).

The lower end 50 of the tubular member 12 may be fitted with an inverted cup-shaped member 66 that cooperates with a cup-shaped member 68 projecting upwardly from a lower wall 70 of the container 14 to form a tortuous path 72 for liquid entering and leaving the tubular member. An exhaust aperture 74 is located at the upper end 48 of the tubular member. The size and shape of the tortuous path 72 and exhaust aperture 74 can be adjusted to obtain a desired time delay in the transfer of liquid between the tubular member and container. As with the previous embodiment, this is especially advantageous in fuel tanks where the fuel is subject to sloshing. If desired, a filter material may be positioned over the aperture 74 and the tortuous path 72 to prevent the ingress of foreign particles within the central bore 16.

Figures 4, 5:
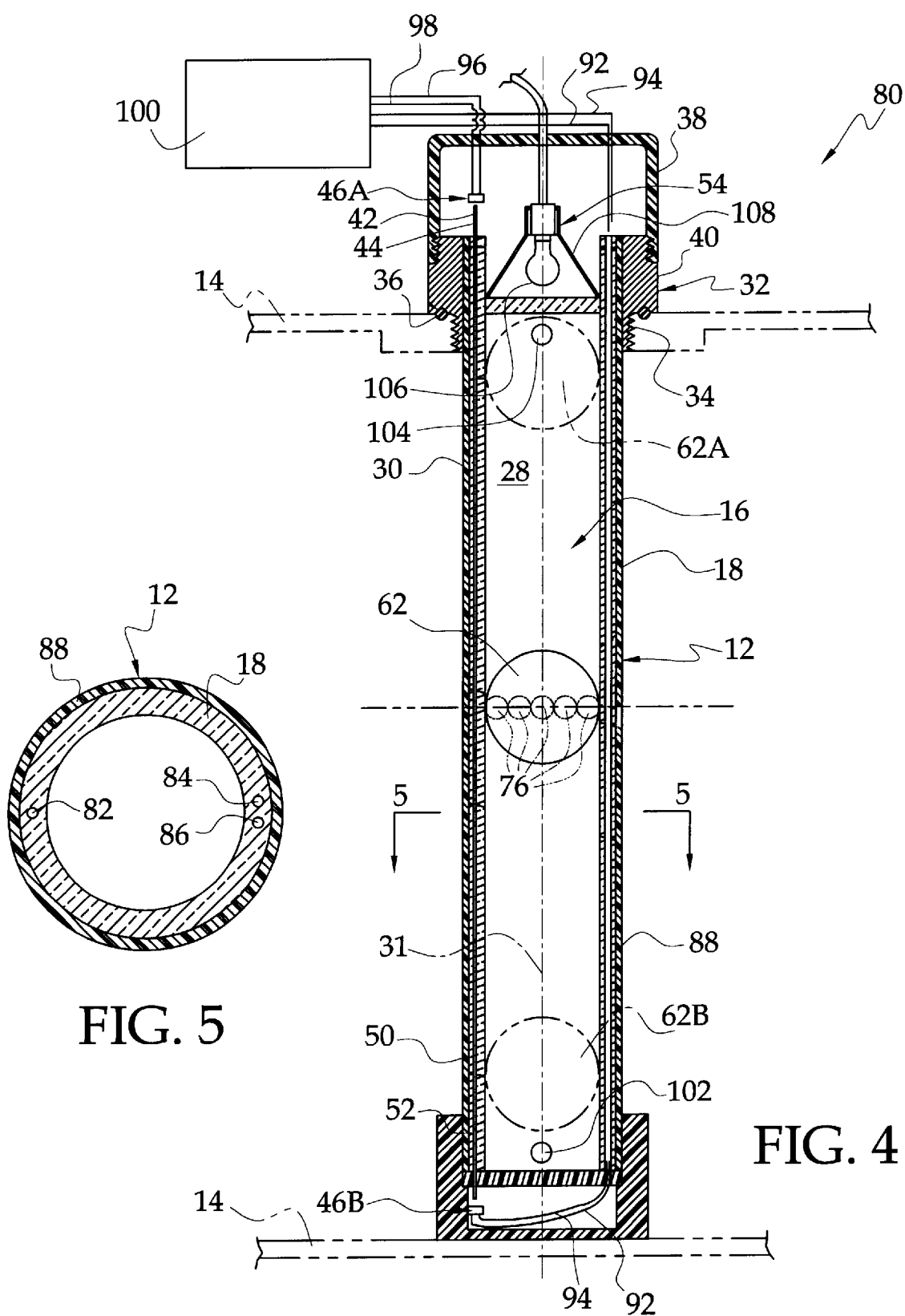
FIG. 4 is a cross-sectioned elevational view of an optical fluid level gauge according to a third embodiment of the invention.
FIG. 5 is an enlarged cross-sectional view of the optical fluid level gauge taken along line 5—5 of FIG. 4.

With reference now to FIGS. 4 and 5, a fluid level gauge 80 according to a third embodiment of the invention is illustrated, wherein like parts in the previous embodiments are represented by like numerals. In this embodiment, the tubular member 12 includes a collector conduit 82 and conductor conduits 84 and 86 that are formed in the wall of the tubular member and extend generally parallel to the central bore 16. Preferably, the conductor conduits 84 and 86 are positioned close together while the collector conduit 82 is preferably located at a diametrically opposite side of the tubular member, but may be positioned closer to the conductor conduits. An opaque covering 88 surrounds the tubular member 12 and serves to block the transmission of unwanted outside light to the collector in the event that the container 14 is constructed of light permeable material. The conduits 82, 84 and 86, as well as the opaque covering 88 can be formed simultaneously with the tubular member during extrusion or other molding processes.

A single light collector 42, that may be similar in construction to the light collectors previously described, is located in the collector conduit 82. The light collector may be co-extruded with the tubular member, injection-molded into the conduit 82 or snaked through the conduit 82 after formation of the tubular member.

An upper photosensor 46A is positioned proximal to the upper end 44 of the light collector 42 while a lower photosensor 46B is positioned proximal to the lower end 52 of the light collector for monitoring the intensity of light at the light collector ends. Electrical leads 92 and 94 from the lower photosensor 46B pass through the conductor conduits 84 and 86, respectively, and into the cap 38. Electrical leads 96, 98 from the upper photosensor 46A together with the electrical leads 92, 94 are connected to signal processing circuitry 100. Preferably, the electrical leads are co-extruded with the tubular member 12.

A fluid fill aperture 102 extends through the wall 18 of the tubular member 12 at the lower end 50 while a vent aperture 104 extends through the wall 18 at the upper end. As in the previous embodiments, the size and shape of the apertures can be adjusted to obtain a predetermined damping effect for fluid in the tubular member when fluid in the container is subject to sloshing or other movement.

A light source 54 is located at the upper end of the tubular member and preferably includes a long-life incandescent bulb 106 surrounded by a reflector 108. However, other light sources as previously described may be used. Preferably, the reflector 108 is configured for reflecting and collimating light from the bulb 106 directly onto the float 62, which in this embodiment is coated with a reflective material. The float then reflects the incident light onto the light collector 42 in the vicinity of the float. In an alternative embodiment, the reflector or other light source may be arranged to project light onto both the light collector 42 and the float 62.

Since the fluorescent-doped fiber optic absorbs and loses light along its length, the light intensities at the collector ends are reflective of the float position along the length of the collector. By way of example, when the container is full, the float is positioned at the upper end of the tubular member 12, as represented by phantom line 62A. Collimated light is projected onto the float and is reflected onto the light collector 42. The light collector in turn channels the incident light to the upper and lower ends 44 and 52 of the light collector and onto the photosensors 46A and 46B, respectively. Some of the light received by the light collector 42 is reflected internally while some of the light is refracted out of the light collector. The light intensity at the upper end 44 of the light collector 42 is greater than the light intensity at its lower end 52 due to the longer distance from the incident light through which the light may be refracted out of the light collector. As the distance between the incident light and the upper end 44 of the light collector increases, i.e. when the float descends due to less liquid in the container, the light intensity at the upper end of the light collector decreases due to the increased distance through which the light may be refracted out of the light collector. Likewise, the light intensity at the lower end of the light collector increases due to the decreased distance through which the light may be refracted out of the light collector.

As the float 62 descends toward the lower end 50 of the tubular member 12, as represented by phantom line 62B, such as when liquid is removed from the container, the light intensity at the lower end 52 of the light collector becomes greater than the light intensity at its upper end. The light intensity at one or both ends of the light collector can be measured by the photosensors 46A, 46B in order to determine the position of the float with respect to the light collector, and thus the level of liquid in the container.

When the light source is arranged to project light directly onto the light collector, a different effect occurs. When the light source 54 and float 62 are at the upper end of the tubular member 12, the light intensity at the upper end 44 of the light collector 42 is greater than the light intensity at the lower end 52. This is because light is already incident on the upper end 44 of the light collector 42 from the light source 54. Some of the light that propagates toward the lower end 52 of the light collector is refracted out of the collector due to the length between the light source 54 and the lower light collector end 52. This results in the relatively low light intensity at the lower light collector end 52. When the float 62 descends toward the lower end 50 of the tubular member, the light intensity at the light collector lower end 52 increases since the length of the light collector exposed to light increases. The intensity at the upper collector end 44 increases much less dramatically, since the upper portion of the light collector initially exposed to the light is near saturation.

With each of the above arrangements, the signals from the upper and lower photosensors can be compared, normalized, etc., to eliminate signal variations that may occur from material aging, variations in light intensity, temperature effects on the photosensors, etc.

In an alternative arrangement, the upper photosensor 46A can be situated for receiving light directly from the light source 54 and the signals from both photosensors can be used to compensate for the above-noted variations.

Figures 6, 7:
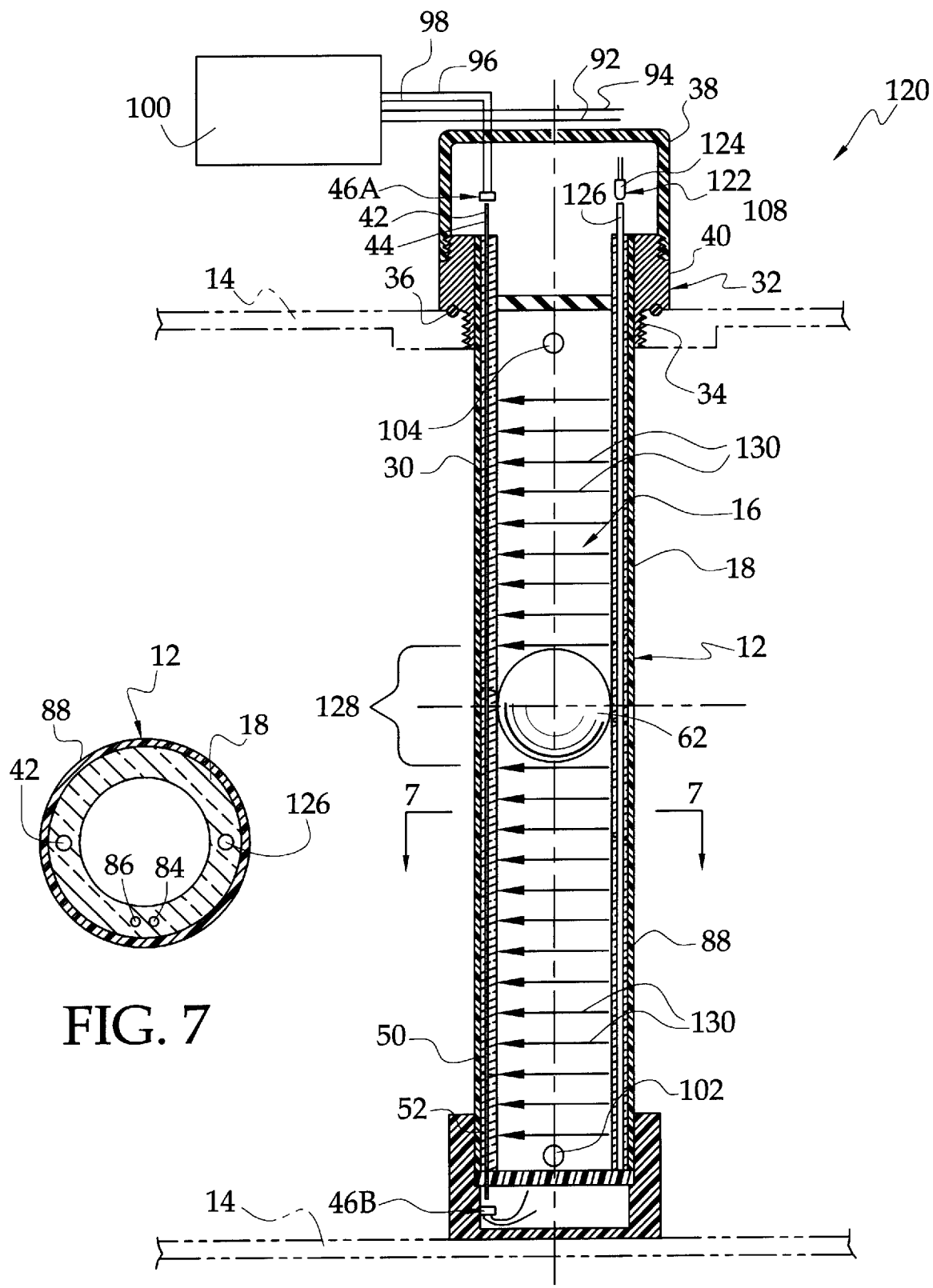
FIG. 6 is a cross-sectioned elevational view of an optical fluid level gauge according to a fourth embodiment of the invention.
FIG. 7 is an enlarged cross sectional view of the optical fluid level gauge taken along line 7—7 of FIG. 6.

Turning now to FIGS. 6 and 7, a liquid level gauge 120 according to a fourth embodiment of the invention is illustrated, wherein like parts in the previous embodiments are represented by like numerals. The liquid level gauge 120 includes a light source 122 comprising a light emitting element 124, such as an incandescent bulb, LED, fluorescent light, and so on, arranged at the end of an optical light guide 126 that emits radiant energy along its length. The light guide 126 is preferably positioned on the tubular member diametrically opposite the light collector 42 and normally projects light rays 130 along its length toward the light collector. When the level of a relatively transparent or translucent liquid is to be measured, the float 62 blocks a section 128 of the light collector from the light rays 130 emanating from the light guide 126. As the float moves up and down in the tubular member 12 in response to change in liquid level, the light intensities at the ends of the light collector 42 vary.

When the level of an opaque fluid is to be measured, the float 62 can be eliminated since the fluid within the bore 16 will block light from reaching at least a portion of the light collector 42. The length of light incident on the light collector 42 would then be indicative of liquid level, which is measured by the photosensors 46A and 46B.

Although a single float 62 is shown for each of the above embodiments, a plurality of floats 76 (shown in phantom line in FIG. 4) of smaller diameter or of different shapes can be used. The use of plural floats decreases the likelihood of their lodgement in the bore 16 due to dimensional changes from temperature, humidity, deposits, and so on, than when a single float is used.

Figure 8:
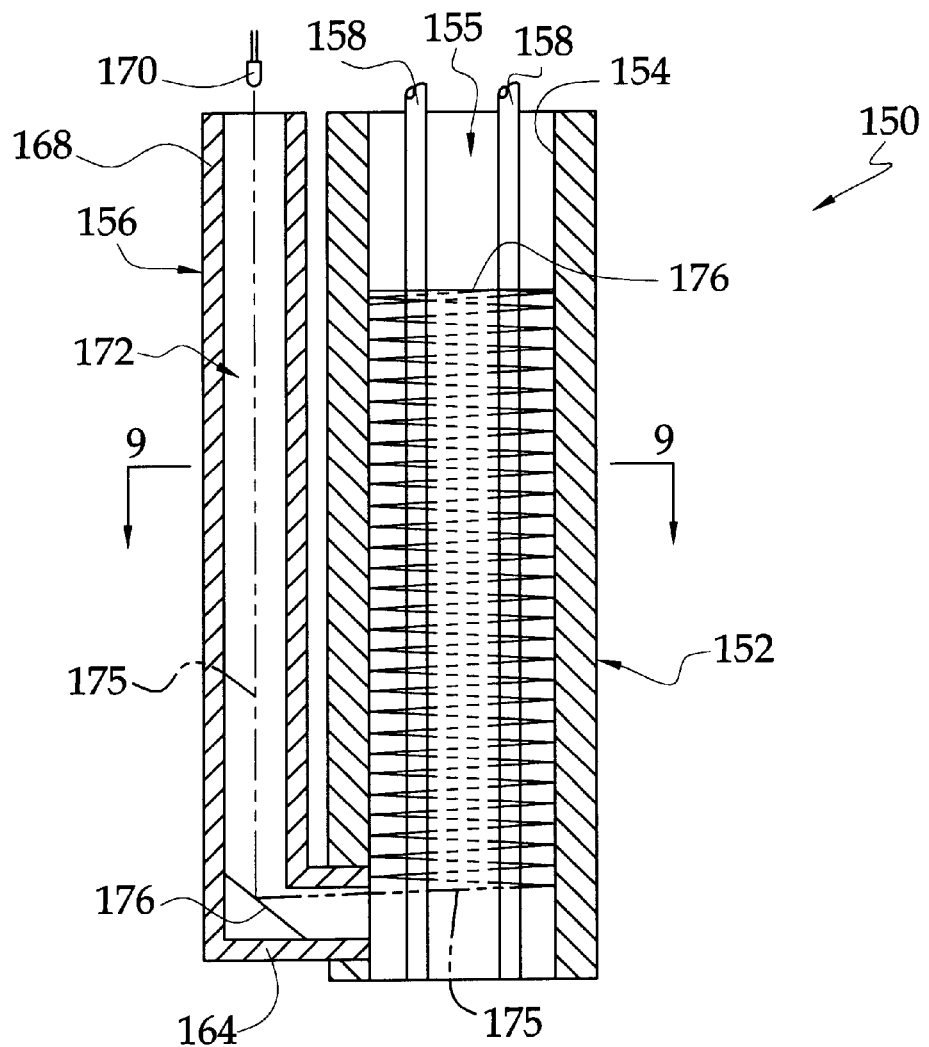
FIG. 8 is a cross-sectioned elevational view of an optical fluid level gauge according to a fifth embodiment of the invention.
Figure 9:
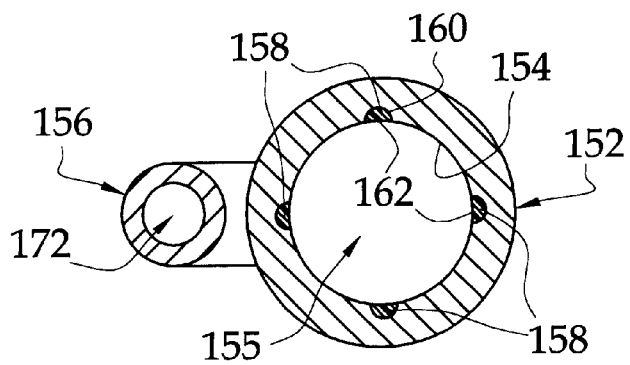
FIG. 9 is a cross sectional view of the optical fluid level gauge taken along line 9—9 of FIG. 8.

Referring now to FIGS. 8 and 9, a fluid level gauge 150 according to a fifth embodiment of the invention is illustrated. The fluid level gauge 150 comprises a housing or tubular member 152 with an inner reflecting surface 154 that defines a bore 155. A tubular light guide 156 is positioned alongside the tubular member 152. The tubular member 152 is preferably constructed of a metallic material that can be highly polished on the inner surface, such as through electropolishing. Alternatively, the tubular member 152 can be constructed of a plastics material with a reflective coating deposited on the inner surface 154 in a well-known manner. Although the tubular member 152 is show as circular in cross section, many different cross sectional shapes are contemplated, such as rectangular, triangular, oval, etc.

One or more light collectors 158, similar in construction to the light collectors 42 previously described, are located within channels 160 formed in the inner surface 154. Each light collector 158 preferably has an inner surface 162 that is flush with the inner surface 154 of the tubular member 152. The light collector(s) 158 are preferably constructed of a base material that is compatible to the liquid being measured, since they are in direct contact with the liquid.

A lower end 164 of the tubular light guide 156 is connected to the tubular member 152 while an upper end 168 thereof is positioned in proximity to a light source 170, such that light is projected into a bore 172 of the tubular light guide. A reflective surface 176 within the bore 172 directs light 175 at an acute angle with respect to horizontal into the tubular member. The light guide 156 may alternatively be in the form of a fiber optic that extends from the light source 170 to the lower end of the tubular member. A laser diode or collimated light is preferable, although other sources of light may be used.

The light entering at the lower end of the tubular member 152 from the light source 170 preferably projects upwardly at an angle of approximately 89° with respect to vertical. In this manner, light is transmitted through the liquid in the tubular member 152 and reflected upwardly from the inner surface 154 until it reaches the upper surface 176 of the liquid. When the liquid has a greater index of refraction than air, gas or vapor above it, and the angle of light incident on the upper surface 176 of the liquid is greater than or equal to a predetermined critical angle with respect to vertical, the light is totally reflected on the upper surface. Thus, only light transmitted through the liquid will be incident on the light collectors 158. As the liquid level in the tubular member decreases, less of the collector length will be exposed to the light. Likewise, as the liquid level in the tubular member increases, more of the collector length will be exposed to the light. As in the previous embodiments, one or more photosensors (not shown) are arranged at the ends of the light collectors.

By way of example, if the liquid being measured is octane in the form of $C_8H_{18}$, the critical angle is approximately 45° with respect to vertical. With light entering the tubular member 152 at 89° with respect to vertical, total internal reflection of the light will occur even when the octane is tilted up to an angle of approximately 44° with respect to vertical, as may occur during climbing, descending, acceleration, deceleration, etc., of the vehicle. It is to be understood, of course, that light entering the bore 155 from the light guide 156 may be oriented at other angles.

In an alternative arrangement, one or more floats can be positioned in the bore 155 for blocking light from reaching the light collectors 158 above the liquid level 176.

Figure 10:
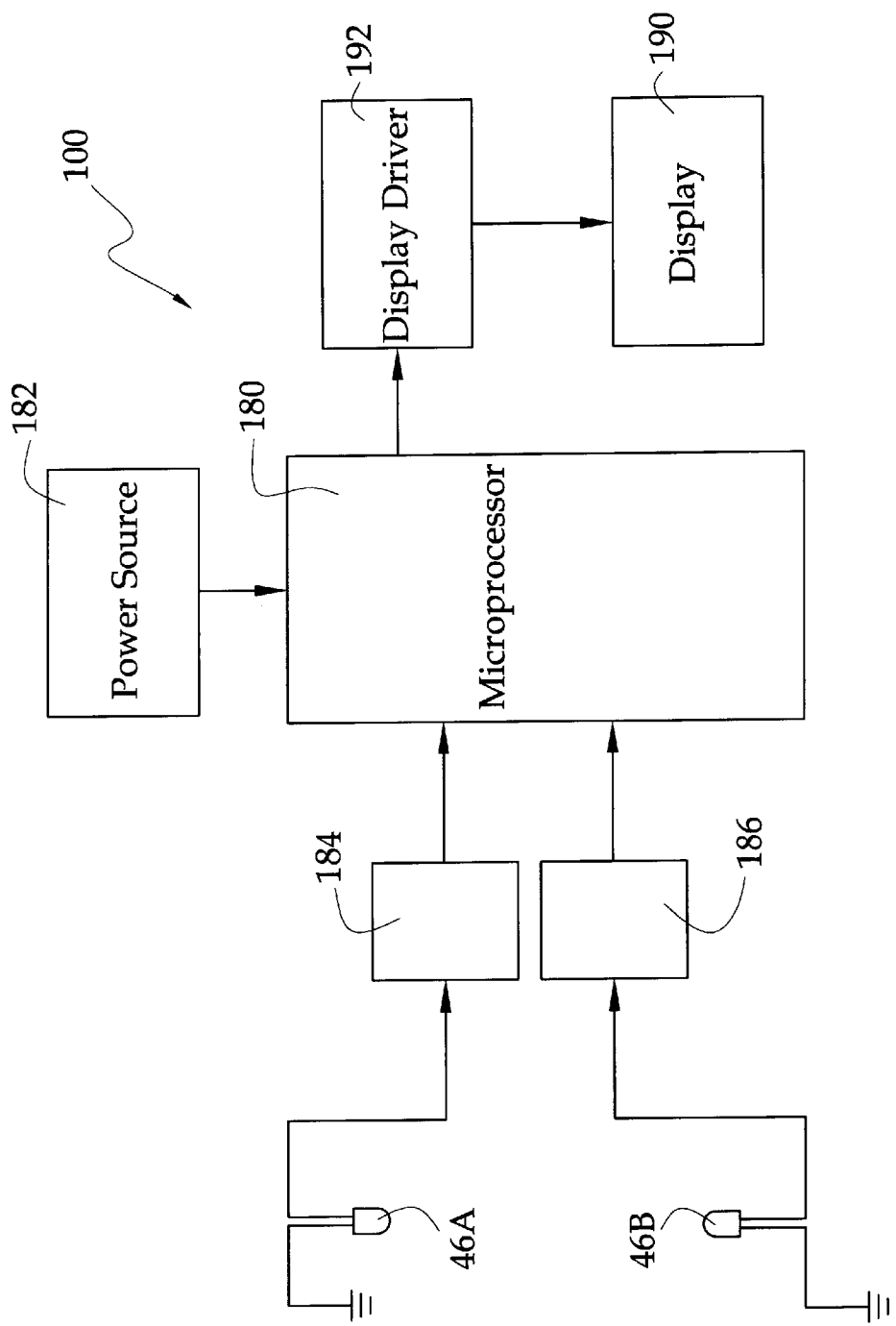
FIG. 10 is a block diagram schematic representation of electrical signal processing circuitry that may be used with all embodiments of the fluid level gauge of the present invention.

With reference now to FIG. 10, a schematic representation of electrical processing circuitry 100 that may be used in each of the above embodiments is illustrated. The circuitry 100 includes a microprocessor 180, an electrical power source 182 connected to the microprocessor, the photosensors 46A and 46B connected to the microprocessor via signal amplifiers 184 and 186, respectively, and a display 190 connected to the microprocessor through a display driver 192. Although many different types of signal amplifiers may be used, a dual operational amplifier for the signal amplifiers 184, 186, such as LM358 manufactured by National Semiconductor, is preferred due to its low cost, ability to operate with a single power supply, and relative ease in setting a desired gain factor. Although in many instances a signal amplifier may be necessary for the photosensors, the amplifier may be eliminated if the strength of the photosensor signals are great enough to be accepted by the microprocessor. The signal strength can be varied depending on the intensity of the light source emission, the amount of collector area exposed to the light source, as well as the diameter or other cross dimension of the collector.

The analog signals produced by the photosensors 46A, 46B are amplified and sent to the microprocessor 180, preferably at different input ports. Preferably, the input ports of the microprocessor are analog input ports that receive and convert the signals to digital form before further processing. Alternatively, separate A/D converters or a multiplexer with a single A/D converter may be provided. The converted signals from the photosensors 46A, 46B can then be normalized in the microprocessor 180 in order to compensate for variations in light output of the light source 54 or 170 due to aging and other factors, as well as variations in temperature. Normalization of the photodiodes is accomplished by mathematic manipulation of the converted photosensor signals. Namely, the following normalization formula can be programmed into the microprocessor:

$$D_N = \frac{D_1 - D_2}{D_1 + D_2}$$

where $D_N$ is the normalized output, $D_1$, is the signal from the photosensor 46A, and $D_2$ is the signal from the photosensor 46B. Depending on the location of the float 62 (or liquid level) with respect to the collector 42, the normalized output may be positive or negative. The normalized output can then be further manipulated, if necessary, and sent to the display 100 via the display driver 102 in a well-known manner.

In each of the above embodiments, one or both photosensors may be separated from the ends of the light collector by one or more intermediate structures, such as fiberoptics, light pipes, conduits, or other light transmitting means. It is to be understood therefore, that the term "proximal" as used throughout the specification in reference to the position of the photosensor(s) with respect to the end(s) of the light collector may include such intermediate structures.

The term "opaque" as used throughout the specification refers to any material that blocks a sufficient amount of light from the collector(s) such that movement of the float(s) or upper surface of the liquid is detectable. Thus, translucent blocking members or blocking members filtering out certain wave lengths of radiant energy may also be suitable for use in the above embodiments.

It is to be understood that the terms upper, lower, inner, outer, horizontal, and vertical, as well as their respective derivatives as may be used throughout the specification, refer to relative, rather than absolute orientations or positions.

While the invention has been taught with specific reference to the above embodiments, those skilled in the art will recognize that changes can be made in form and detail without departing from the spirit and the scope of the invention.

For example, the light source may be arranged in orientations and/or locations other than those described above, and may comprise mirrors, lenses, fiber optics, and so on, for transmitting radiant energy to the light collector.

Although the different embodiments of the optical fluid level gauge are shown with the tubular member in a vertical orientation, it is to be understood that orientations other than vertical are possible. Moreover, the level of other materials that exhibit liquid-like flow properties can be measured with the present invention, such as grain, sand, etc. Thus, the term "liquid" as used throughout the specification may also be applied to such materials.

Furthermore, although the light collector(s) are shown located in the wall of the tubular member 12 or 154, it is to be understood that the collector(s) may be arranged on the inner or outer surfaces thereof. In addition, the light collector(s) may spiral around the tubular member to thereby increase the length of the collector(s), and thus the sensitivity of the gauge to changes in liquid level.

Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. An optical gauge for measuring a level of a liquid in a container, the optical gauge comprising:

an elongate, tubular member having opposite ends and a bore extending between the opposite ends, the bore being adapted to receive liquid that may be present in the container;

a light source positioned for projecting radiant energy into the bore from one end of the tubular member;

a continuous elongate light collector extending along a length of the tubular member for receiving, at least indirectly, radiant energy from the light source, the light collector having opposite ends and being formed such that radiant energy incident on a length of the light collector is transmitted to the light collector ends;

a light blocking member located within the bore and operably associated with an upper surface of the liquid for blocking at least a portion of the radiant energy from the light collector between the light blocking member and the other end of the tubular member, the light blocking member being movable with respect to the light collector in response to change in liquid level within the tubular member for varying the position of the radiant energy incident on the light collector to thereby vary the amount of radiant energy transmitted to the light collector ends; and at least one photosensor positioned for detecting the amount of radiant energy transmitted to at least one of the light collector ends, wherein the amount of radiant energy transmitted to the at least one light collector end and detected by the at least one photosensor is indicative of the liquid level.

2. An optical gauge according to claim 1, wherein the light blocking member comprises at least one float that is adapted to ride on an upper surface of the liquid that may be present in the tubular member such that measurement of the liquid level is independent of the degree of transparency of the liquid.

3. An optical gauge according to claim 2, wherein the float is opaque to the radiant energy.

4. An optical gauge according to claim 2, wherein the float is spherical in configuration.

5. An optical gauge according to claim 4, wherein the light source is positioned at the one end of the tubular member coincident with a central axis of the bore.

6. An optical gauge according to claim 5, wherein the float has a reflective surface for reflecting the radiant energy toward the light collector between the float and the one end.

7. An optical gauge according to claim 6, wherein the light source is collimated.

8. An optical gauge according to claim 1, wherein the light blocking member comprises a plurality of floats that are adapted to ride on an upper surface of the liquid that may be present in the tubular member.

9. An optical gauge according to claim 1, wherein the light blocking member comprises an upper surface of the liquid in the tubular member.

10. An optical gauge according to claim 1, wherein the bore comprises at least one elongate channel, the light collector being associated with the at least one channel.

11. An optical gauge according to claim 10 wherein the bore includes a reflective surface.

12. An optical gauge according to claim 1, wherein the light source is arranged to project radiant energy into the bore from the one end of the tubular member at an acute angle with respect to a central axis of the bore such that the radiant energy is incident on an inner surface of the bore and the light collector between the light blocking member and the one end of the tubular member.

13. An optical gauge according to claim 1, wherein the light blocking member comprises the liquid in the tubular member.

14. An optical gauge according to claim 1, and further comprising means for damping the transfer of fluid between the bore and the container.

15. An optical gauge according to claim 1 wherein the light collector comprises a fluorescent-doped fiber optic.

16. An optical gauge for measuring a level of transparent or translucent liquid, the optical gauge comprising:

an elongate, tubular member having opposite ends with a bore extending between the opposite ends, the bore having a central axis and being adapted to receive liquid;

a light source positioned for projecting radiant energy into the bore along the central axis from one of the ends of the tubular member;

an elongate continuous light collector spaced from the light source and extending along a length of the tubular member for receiving, at least indirectly, radiant energy from the light source, the light collector having opposite end and being formed such that radiant energy incident on the light collector is transmitted to the light collector ends;

a float positioned in the bore for movement with an upper surface of the liquid, the float being opaque to the radiant energy for blocking the radiant energy from a) the liquid, and b) the light collector between the float and the other end of the tubular member, wherein movement of the float with respect to the light collector varies the position of the radiant energy incident on the light collector to thereby vary the amount of radiant energy transmitted to the light collector ends; and at least one photosensor positioned for detecting the amount of radiant energy transmitted to at least one of the light collector ends;

wherein the amount of radiant energy transmitted to the at least one light collector end and detected by the at least one photosensor is indicative of the liquid level independent of the degree of transparency of the liquid.

17. An optical gauge according to claim 10, wherein the light collector comprises a fluorescent-doped fiber optic.

18. An optical gauge according to claim 16, wherein the float has a reflective surface for reflecting the radiant energy toward the light collector between the float and the one end.

19. An optical gauge according to claim 16, wherein the light source is arranged to project radiant energy into the bore from the one end of the tubule member at an acute angle with respect to a central axis of the bore such that the radiant energy is incident on an inner surface of the bore and the light collector between the light blocking member and the one end of the tubular member.

20. An optical gauge according to claim 16, wherein the bore comprises at least one elongate channel, the light collector being associated with the at least one channel.

* * * * *